April 7, 1931.  G. LANGFORD  1,799,381

EVEN WEAR BAR

Filed March 28, 1929  3 Sheets-Sheet 1

Inventor:
George Langford.
By Brown, Jackson, Bottcher & Dienner.
Attys

April 7, 1931.  G. LANGFORD  1,799,381
EVEN WEAR BAR
Filed March 28, 1929  3 Sheets-Sheet 2

Inventor:
George Langford.
By Brown, Jackson, Boettcher & Dienner
Attys

April 7, 1931.   G. LANGFORD   1,799,381
EVEN WEAR BAR
Filed March 28, 1929   3 Sheets-Sheet 3

Inventor:
George Langford.
By Brown, Jackson, Boettcher & Dienner
Attys.

Patented Apr. 7, 1931

1,799,381

UNITED STATES PATENT OFFICE

GEORGE LANGFORD, OF JOLIET, ILLINOIS, ASSIGNOR TO McKENNA PROCESS COMPANY OF ILLINOIS, OF JOLIET, ILLINOIS, A CORPORATION OF ILLINOIS

EVEN-WEAR BAR

Application filed March 28, 1929. Serial No. 350,734.

This invention relates to angle bars for use in rail joints, and more particularly to what I term a balanced bar.

In rail joints, two joint plates or bars are placed at opposite sides of the rail ends and are drawn together by bolts passing through the bars and the webs of the rails so as to hold the head and flange fishing surfaces of the bars tightly against the corresponding fishing surfaces of the rails. The fishing surfaces of the bars wear much more rapidly at the center portions than at the end portions thereof, due to the up and down motion imparted to the rail ends by the rolling stock traveling thereover. It is essential that the joint be maintained tight, and this necessitates pulling in the center portions of the bars to the rail ends, by means of the bolts, to take up this wear.

Since the center portions of the bars wear at a much greater rate than the end portions, this drawing up of the bars flexes them laterally, which is highly objectionable as placing the bars under excessive strains and subjecting the bolts to great tension.

When light bars of simple angle section were used, as in the past, such bars being formed of comparatively soft and untempered low carbon steel, the lateral flexing of the bars above referred was not so highly objectionable due to the fact that these bars, after being flexed or bent, would tend to set thus remaining bent without subjecting the bolts to excessive tension. However, even under such conditions this flexing of the bars was objectionable as subjecting them to undesirable strains and interfering with accurate fit of the fishing at the end portions of the bars. Of late years, the railroads have adopted the use of heavier rolling stock, this necessitating the use of heavier rails and joint bars of much greater strength and much heavier than the light bars previously used, above referred to. Bars now commonly used in rail joints are of more or less complicated cross-section, heavy, and are formed of high carbon steel highly tempered. The well known I-beam is typical of the present bars, and is extensively used.

In constructing a joint using uncrowned I-beam bars, for example, or other heavy bars such as modern practice necessitates, the bars are bolted up to the rail ends in parallelism therewith and with each other, the bolts being under substantially equal tension.

When the joint is placed in service, wear and strain soon change these relationships, the wear being greatest at the central portion of the joint. This wear is taken up by tightening the bolts to draw the bars to the rail ends, and as there is much more take-up at the center than at the ends, the bars which were once straight and parallel to each other became convex on their inner faces, being forcibly bent laterally by the two center bolts. This places the bars under lateral strain and the bolts in increased tension proportional to the lateral stiffness of the bars. Some of the heavily reinforced bars are so resistant to this lateral bending that larger bolts and greater tension than usual must be employed in order to get the joint tight at the center. After the joint has been in service a comparatively short time, the two center bolts and the center portions of the bars are always under great lateral strain, which increases with wear of the joint and is augmented by vertical strains whenever a train wheel passes over the joint.

In the former joints using light untempered bars of low carbon content and of plain angle section, above referred to, a bolt tension of 10,000 pounds, or less, was sufficient to maintain the joint tight at the center. This permitted the use of relatively light or small bolts. However, in using the reinforced I-beam type of bar, which is now in extensive use, a tension of 25,000 pounds and over is required to draw the center of the bars into contact with the rail fishing surfaces after the joint becomes slightly worn. This necessitates the use of extra heavy and hardened bolts, and even these bolts are frequently literally pulled apart by the enormous tension to which they are subjected.

It will thus be seen that both the bolts and the bars are placed under enormous stresses, as the joint is drawn up, and serious difficulty is encountered in these joints due to breakage of both the bolts and the bars. This difficulty is due solely to two things—the greater rate of wear of the fishing surfaces at the center of the joint, and the enormous resistance to lateral flexure offered by the modern joint bar, particularly the reinforced I-beam type of bar which is so extensively used.

In using crowned bars, it is necessary to bend or flex the end portions of the bar to hold the crowned center in contact with the rail fishing. If the crowning of the bar be light or average, it is soon obliterated by wear and then the center of the bar must be drawn inward, as wear progresses, in the same manner as in the ordinary uncrowned bar. If the bar is heavily crowned, it will be considerably flexed and under severe lateral strain, being convexed outwardly. It is evident, therefore, that in joints of present construction, as well as in the earlier joints, the bars are subjected to lateral flexure which is highly objectionable, particularly when employing heavily reinforced bars such as are of necessity used in present day construction. Also, in using crowned bars, the rail ends are pinched between the inwardly flexed ends of the bars causing the bars to "freeze" to the rails and preventing proper expansion and contraction of the joint. The flexing of the bars, whether crowned or uncrowned, is also objectionable as subjecting the end bolts of the joints to shearing stresses which are apt to cause brakeage thereof, though the center bolts of the joint usually give away before fracture of the end bolts occurs.

The numerous and really serious objections to rail joints of present construction can be avoided by maintaining the bars parallel with the rail ends at all times and under equal tension throughout their length. By doing this all lateral flexing of the bars and the numerous difficulties resulting therefrom are avoided. This also has the advantage of maintaining accurate fit between the fishing of the rails and the bars at the ends of the bars, which is highly desirable as producing a stronger and tighter joint than is possible where this fit at the end portions of the bars is not maintained. Heretofore, the wear of the center portion of the joint at a greater rate than the end portions has been considered unavoidable, and the resulting flexing of the bars in taking up this wear has been accepted as a necessary evil. I have found that by properly relating the fishing surfaces of the rail ends and the bars, it is possible to cause the surfaces to wear at the same rate throughout the whole length of the joint. This results in the take up of the joint to compensate for wear being the same at the end portions of the bars as at the center portions thereof, so that the bars are maintained in parallelism with each other and the rail ends, and excessive strains on either the bolts or the bars due to lateral flexing of the latter are avoided. An additional advantage of my invention is that much lighter bolts than are now employed can be used, the heavy bolts used at present being objectionable as necessitating relatively large bolt holes in the bars and the webs of the rails, which holes materially weaken both the bars and the rail ends.

One of the main objects of my invention is to provide a rail joint in which the rate of wear of the fishing surfaces is substantially the same at the end portions of the bar as at the center portions thereof. Another object is to provide a rail joint bar certain of the fishing surfaces of which are so disposed that the area of contact thereof with the corresponding surfaces of the rail ends is less at the end portions of the bar than at the center portion thereof. A further object is to provide a bar of this character which can be readily produced new or by reforming a worn bar. Further objects and advantages of my invention will appear from the detail description.

Figure 1:
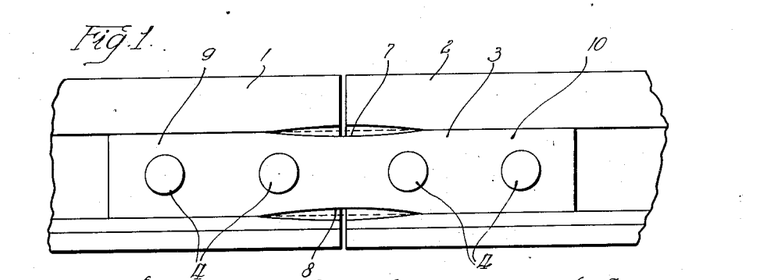
Figure 1 is an elevation of a rail joint of present day construction, showing the wear which occurs at the central portion of the joint.
Figure 2:
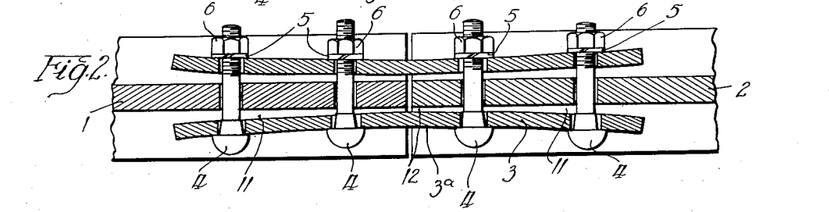
Figure 2 is a horizontal section through a rail joint of present day construction, using uncrowned or lightly crowned bars, showing the center portions of the bars flexed inwardly to take up wear.
Figure 3:
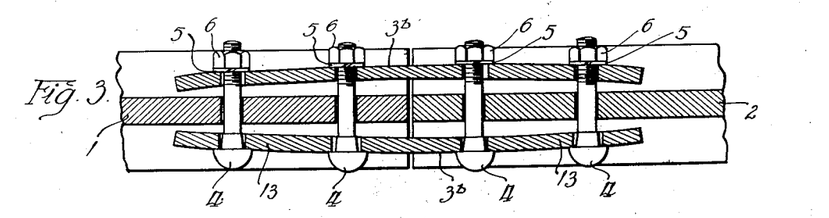
Figure 3 is a view similar to Figure 2, showing the end portions of heavily crowned bars flexed inwardly to take up wear, the outer face of the bar being convexed.

In Figures 1 to 3 of the drawings I have illustrated semi-diagrammatically, and for purposes of comparison, rail joints constructed in accordance with the present practice. Figure 2 shows a joint using bars which were initially uncrowned or lightly crowned, and Figure 3 shows a joint using heavily crowned bars. In all of these figures, the bars are shown as plain metal straps, for clearness of illustration, though in practice these bars are of I-beam section and quite heavy.

In Figure 1, the joint comprises the rail ends 1 and 2 tied together by bars 3 which, as stated, are of I-beam section in practice, these bars being at opposite sides of the rail ends. Bolts 4 pass through the bars and the webs of the rail ends, and receive lock washers 5 and nuts 6. During use of the joint, wear occurs at 7 and 8 at the head and flange fishing surfaces, respectively, of the center portion of the bar. The wear at the center one third of the bar occurs at a much greater rate than the wear at the end portions 9 and 10, which constitute approximately one third of the length of the bar each, the rate of wear of these end portions being relatively slight. In this connection, particular attention is called to the fact that it is the accepted practice in rail joints of present and prior constructions, to have the area of contact of the fishing surfaces of the rail ends and the bars at each end of the bars equal to the area of contact at the center portions of the bars.

In Figure 2 of the drawings, I have shown a joint using bars which are either uncrowned or but slightly crowned. After the joint has been in use for some time, the bars 3 assume the shape of Figure 2, the center portion of the bars being drawn inwardly by the center bolts to take up wear and the outer faces of the bars being concave at $3^a$. It will be noted that the space 11 at the end portions of the bar is much greater than the space 12, between the center portion of the bar, and the webs of the rails. This is due to the fact that the center portion of the bar wears at a much greater rate than the end portions, this wear occurring, of course, at the fishing surfaces. The bar 3 is thus flexed laterally and inwardly, so that both of the bars and the center bolts of the joint are placed under severe lateral strain and tension.

When using I-beam bars, such as are used in joints of present construction, this lateral flexing of the bars results in a dangerously high percentage of breakage of both the bars and the bolts. In Figure 3, I have illustrated a joint using highly crowned bars $3^b$. In these bars, the highly crowned center portions thereof are held in contact with the fishing surfaces of the rail ends by bending the end portions 13 of the bar inwardly toward the rail, this being accomplished by the end bolts of the joint. As the wear continues, it is necessary to bend the ends of the bars further in toward the webs of the rail to take up the wear. The center bolts of the joint are also used to pull the center portion of the bars inwardly to take up wear, and, as this wear proceeds at the center of a joint at a greater rate than at the ends thereof, the center portions of the bars are pulled inwardly. This continues until the outer faces of the bars are concave, as in Figure 2. In high or heavily crowned bars the outer faces thereof remain convex longer than in uncrowned or lightly crowned bars. The bar is thus under a continual lateral strain and, as it is necessary to pull up the center portions of the bars more than the end portions thereof, the bars are submitted to additional stresses adjacent the ends of the center portions thereof, that is, adjacent the center bolts. The bolts are also subjected to severe tension, this tension of the bolts and stresses to which the bars are subjected, causing breakage of both the bolts and the bars in many instances after the joint has been in use a comparatively short time. In bars of such type, the center portions of the bars contact the rail fishing surfaces to a greater extent than the end portions which are flexed inwardly and act as powerful springs to take up the center wear.

This is objectionable as the bars are at all times under severe lateral stresses and the bolts are under heavy tension. Also, in a bar of this character, the length of the center portion must be confined to the relatively short zone where the center wear of the joint occurs. If the center portion of the bar extended appreciably beyond this zone, there would be created a situation where the end portions of the fishing surfaces of the bar would wear at a less rate than the center portions of such surfaces, these less worn end portions preventing taking up of wear of the center portion of the bar except by flexing this center portion inwardly by means of the center bolts, as when using a heavily crowned bar of the type of Figure 3. In fact, this difficulty is frequently encountered in bars of this type. A further objection to the bar in which the center portion has greater contact area than the end portions is that the area of contact between the rail ends and the bars is necessarily restricted and the joint does not possess the strength and rigidity which is obtained by having the bars in contact with the rail ends under the same lateral tension throughout the length of the bars.

It will be noted that in rail joints of present construction it is unavoidable that the bars are flexed either inwardly or outwardly to take up wear at the center of the joint. This is highly objectionable for numerous reasons above pointed out in detail. So far as I am aware, it has never before been proposed to provide a rail joint in which the fishing surfaces of the rail ends and the bars are so disposed and related as to obtain uniform rate of wear of these surfaces throughout the length of the bars, thus maintaining the bars in the same relation to the rail ends as when initially applied and eliminating lateral flexing or bending of the bars due to the take up of wear at the center of the joint.

This I believe to be broadly new.

Figure 4:
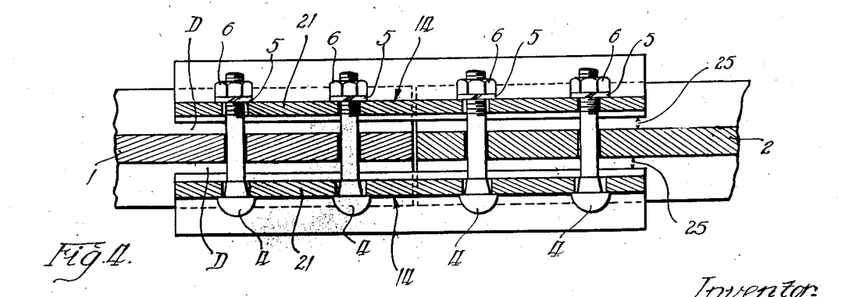
Figure 4 is a horizontal section through a joint in accordance with my invention, showing the relative positions of the bars and the rail ends when the bars are initially applied.
Figure 5:
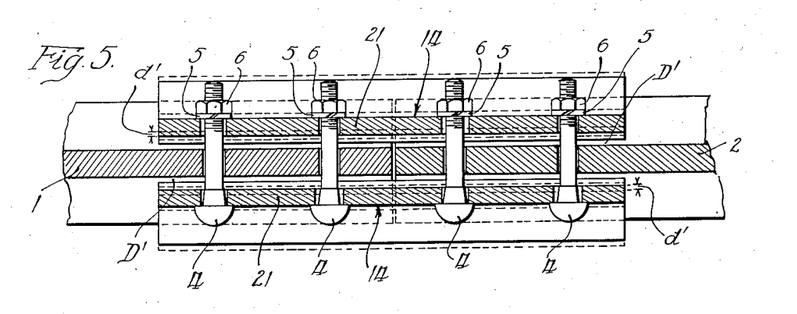
Figure 5 is a view similar to Figure 4 after the joint has been in use for a considerable time and the bars have been drawn in tightly against the rail fishing to take up wear.
Figures 6, 7, 8, 9:
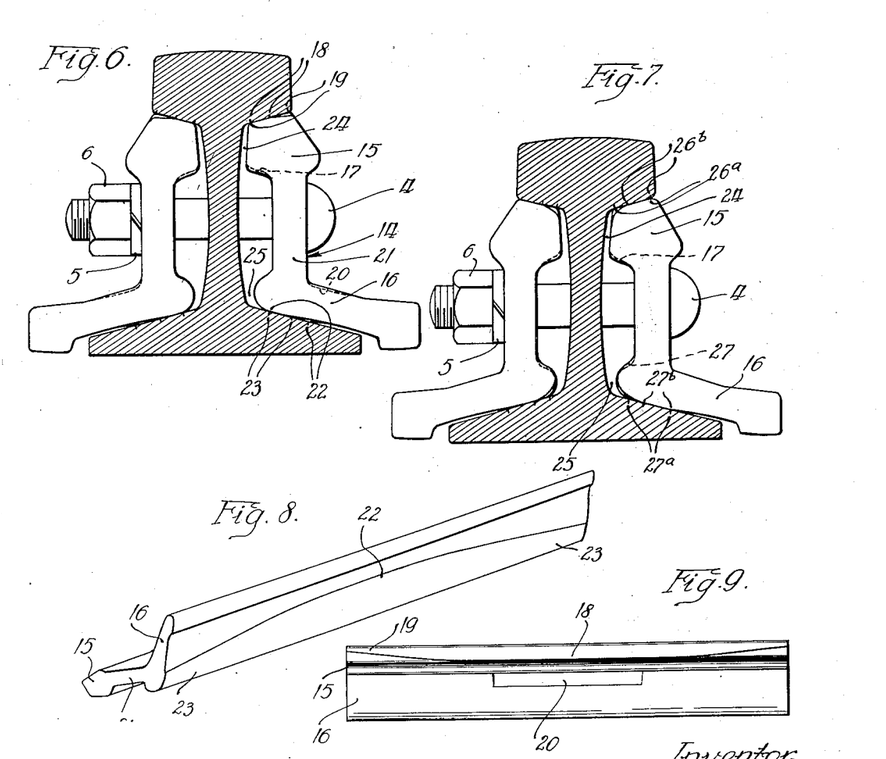
Figure 6 is an end view of a rail joint in accordance with my invention, the rail being shown in section.
Figure 7 is a view similar to Figure 6 showing a modified form of bar.
Figure 8 is an underneath perspective view of the bar of Figure 6.
Figure 9 is a plan view of the bar of Figure 6.

In Figures 4 and 5, I have illustrated, in horizontal section, a rail joint constructed in accordance with my invention. In constructing this joint, I use bars 14 such as those illustrated in Figures 6, 8 and 9. This bar comprises the head 15 and a flange 16 being, in general, of reinforced I-beam construction. The bar is accurately formed in dies and in forming the bar the inner portion of head 15 is pressed outwardly at the center portion thereof, providing a depression 17 thus thinning the head laterally. The metal displaced from the depression 17 is caused to flow toward the upper face of the head 15 and is distributed laterally and outwardly along this face of the head merging into the fishing surfaces at the end portion of the head. This produces a fishing surface on the head of the bar the center portion 18 of which is of appreciably greater width than the end portions 19 of the head fishing. Referring more particularly to Figure 9, it will be noted that the head fishing surface of the bar decreases in width substantially uniformly from the center portion thereof to each end of the bar. It therefore follows that this fishing surface decreases in area from the center portion of the bar toward the ends thereof. In practice, this decrease in area is proportioned to correspond to the differences in wear of the fishing surface at different portions of the bar so that the rate of wear of the fishing surface is substantially uniform throughout the length of the bar. Referring again to Figure 6, I also provide a depression 20 at the center portion of the upper face of flange 16, adjacent web or body 21 of the bar, the metal thus displaced from the upper face of the flange being caused to flow inwardly and to be distributed over the under face of the flange in substantially the same manner as at the head of the bar.

I thus produce on the flange 16 a fishing surface shaped, in general, in the same manner as the head fishing surface. This flange fishing surface is relatively wide at its center portion 22 and tapers in width from its center portion toward the ends of the bar, the end portions 23 of this fishing surface being relatively narrow. In this form of the bar the inner edges of the center and end portions of the head and flange fishing surfaces are aligned, the outer edges of these fishing surfaces being of arcuate shape. In practice, if desired, the outer edge of the center one-third of the head and flange fishing surfaces can be a straight line, the outer edge of the end portions of these surfaces being also straight lines.

When the bars 14 are applied, the head and flange fishing surfaces thereof contact the head and flange fishing surfaces of the rail ends in the usual manner, as in Figure 6. As wear occurs, the bars are pulled inwardly toward the rail web to take up this wear, draw space 24 and 25 being provided between the head and flange, respectively, of the bar and the webs of the rail ends, as is known in the art. By forming the fishing surfaces of the bar in the manner illustrated and described, the area of contact between the head and flange fishing surfaces of the bars and the corresponding surfaces of the rail ends is less at the end portions of the bar than at the center portions thereof. I thus provide at the center portion of the bars, where the greatest wear occurs, the greatest area of contact of the fishing surfaces, and this area of contact decreases from the center of the joint toward the ends of the bars at a rate substantially proportional to the difference in wear of the fishing surfaces from the center of the joint to the ends of the bar.

By so disposing the fishing surfaces, I obtain a uniform rate of wear of the fishing surfaces throughout the length of the bar. As a result, the fishing surfaces wear at the end portions of the bars at the same rate at which the fishing surfaces wear at the center portions of the bars, and in drawing up the bars to take up wear all of the bolts of the joint are subjected to equal tension and the bars are drawn inwardly toward the rail for equal distances throughout the full length of the bars. This means that the bars of the joint are maintained in parallelism with each other and with the webs of the rail end at all times, and these bars are not subjected to lateral flexing and the resulting highly objectionable stresses, since there is no necessity for moving the inner portions of the bars inwardly, a greater distance than the outer portions thereof to take up center wear. In addition to eliminating undesirable lateral flexing of the bars, I am also enabled to use comparatively light bolts, since it is necessary to exert only sufficient tension to hold the bars securely in position, the excessively high tension necessary to flex the bars laterally being no longer required. This means that the bolt holes through the bars and webs of the rail ends can be appreciably smaller than in joints of present construction, which is a material consideration as vitally affecting the strength of the rail ends and the bars.

Figures 10, 11:
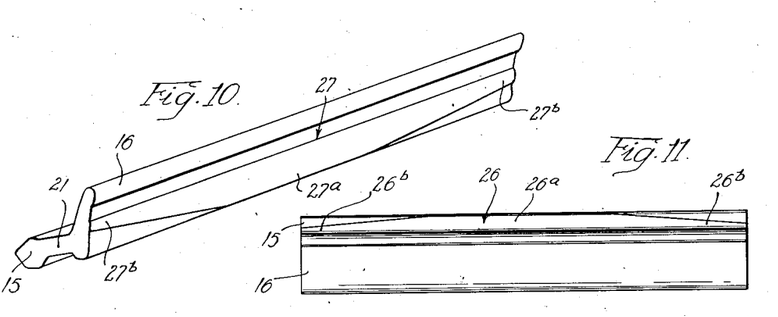
Figure 10 is an underneath perspective view of the bar of Figure 7.
Figure 11 is a plan view of the bar of Figure 7.

In Figures 7, 10 and 11, I have illustrated a modified form of bar adapted for use in my rail joint. In this form, the metal which is displaced at 17 is caused to flow toward the inner edge of the head 15 so that the fishing surface at the head of the bar increases in width from each end thereof toward the center of the bar and inwardly from the outer edge of such surface.

As will be noted more clearly from Figure 11, the inner edge of the center portion 26$^a$ of the fishing 26 is straight and parallel with the inner edge of head 15, and the end portions 26$^b$ of this surface have their inner edges straight and inclined outwardly away from the ends of the center portion 26$^a$. In this form of bar I provide a depression 27 in the inner face of the heel of flange 16, this depression being at the center portion of the bar, that is, in substantially the vertical plane of depression 17 of the head. The metal displaced from the depression 27 is caused to flow inwardly of the flange 16, so as to provide a relatively wide central portion 27$^a$ for the fishing surface 27 of the flange. The flange fishing surface is shaped similarly to the head fishing surface in that the inner edge of the center portion 27$^a$ thereof is defined by a straight line and the inner edges of the end portions 27$^b$ of such surface are defined by straight lines which are inclined outwardly from the ends of the center portion. This bar is applied in the same manner as the bar of Figure 6, with the head and flange fishing surfaces of the bar in contact with the corresponding fishing of the rail end. The rate of wear of the fishing surfaces is substantially uniform throughout the length of the joint and, in taking up wear, the bars are pulled inwardly to the rail ends by the bolts throughout their full length, lateral flexing or bending of the bars being obviated.

Figure 12:
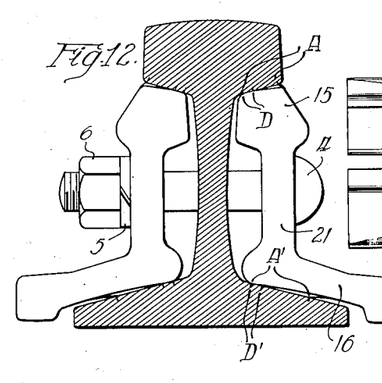
Figure 12 is a view similar to Figures 6 and 7, showing another modified form of bar.
Figure 13:
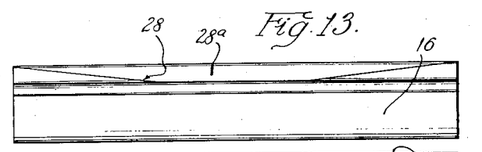
Figure 13 is a plan view of the bar of Figure 12.
Figure 14:
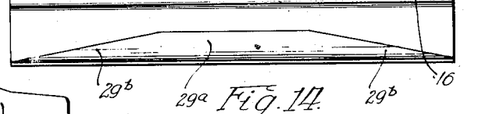
Figure 14 is an underneath view of the bar of Figure 12.

In Figures 12, 13, and 14, I have illustrated another modified form of bar for use in my rail joint. In this bar the center portion 28$^a$ of the head fishing 28 is inclined upwardly at an angle of 14° to the horizontal, this being one of the angles of standard fishings, the end portions of the head fishing being disposed at a less angle than the center portion. The center portion of the fishing is thus disposed somewhat higher than the end portions producing, in effect, a crowned bar.

There are two present general standards of fishing angles; the A. R. A.—A standard of 14°, and the A. R. A.—B of 13°, this latter corresponding to the former A. S. C. E. standard. Obviously, the fishing angle of the bar will correspond to the standard in accordance with which the bar is formed.

The end portions, each approximately one-third of the length of the bar, are each disposed at an angle of approximately 13½ degrees to the horizontal. In the same manner, the center portion 29$^a$ of the flange fishing 29 is disposed at an angle of 14° to the horizontal and each of the end portions 29$^b$ of this fishing is disposed at an angle of 13½ degrees to the horizontal. When the bar is applied, as in Figure 12, the center portions of the head and flange fishing surfaces have contact throughout substantially their full width, as indicated at A, A', respectively, with the corresponding fishing surfaces of the rail end, and the end portions of the head and flange fishing surfaces have contact with the rail fishing surfaces for but a small portion of their width, as at D and D'. While I have referred to the end portions and the central portions of the fishing surfaces as comprising each approximately one third of the length of the bar, I do not intend to limit myself to these precise proportions. Obviously, the relative length of the portions of the fishing surface can be varied considerably, within limits, to obtain the desired results. While it is more desirable, theoretically, to have the area of contact between the fishing surfaces of the bar and the fishing surfaces of the rail decrease substantially uniformly from the center of the joint towards the ends thereof, I find that this is not essential, in practice and in many instances entirely satisfactory results can be obtained by having the center portions of the bar fishing surfaces of one width and the end portions of such surfaces of another width less than the width of the center portions. In the form of bar illustrated in Figure 12, the end portions of the fishing surfaces are equal in width, or even somewhat greater in width, than the central portions of such surfaces. It will be noted, however, that the width of the contact area between these end portions and the corresponding fishing surfaces of the rail end is much less than the width of the contact area between the central portions of the bar fishing surfaces and the corresponding surfaces of the rail.

Figure 15:
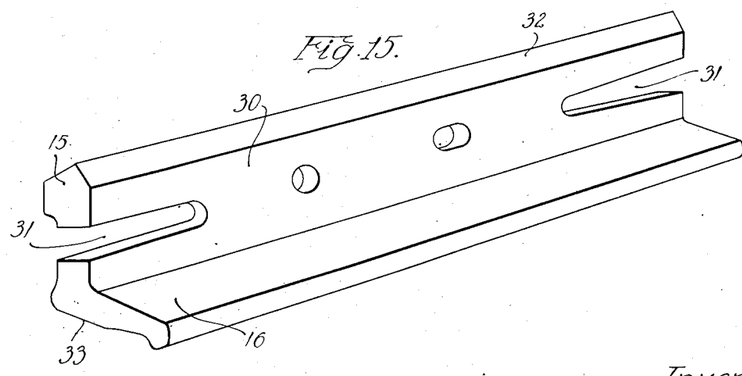
Figure 15 is a perspective view of another modified form of bar.

In Figure 15, I have illustrated another modified form of bar embodying the principle of my invention. The end portions of the body or web 30 of this bar are cleft by slots 31 extending inwardly from the ends thereof. These slots taper inwardly and receive, in their inner ends, the end bolts of the joint. The slots permit vertical flexing of the end portions of the head and flange of the bar. The head fishing or bearing surface 32 is of the same width throughout the length of the bar, as is also the flange bearing surface 33. When the bar is drawn in to take up wear, the end portions of the head and flange of the bar flex vertically toward each other, by reason of the provision of the slots 31, thus permitting of the end portions of the bar being drawn in to the rail ends to the same extent as the center portion. I thus avoid, in this form of bar, subjecting the bars and the bolts to objectionable stresses and tension. As the bar is drawn in, the end portions thereof are placed under tension and maintain the end portions of the head and flange bearing surfaces in close contact with the corresponding surfaces of the rail ends. This results in the end portions of the bar bearing surface wearing at the same rate as the center portion of such surface, after the center portion has been worn slightly and the bars have been pulled in to take up such wear. As a result, the flexing of the end portions of the bar vertically is not materially increased, if at all, over the initial flexing of these parts which occurs when the bars are first pulled in to take up the first slight wear of the joint. It will thus be seen that this bar embodies my invention as above set forth, even though the bearing surfaces are of substantially the same width throughout the length of the bar.

My invention therefore comprehends bars so constructed as to permit of the ends of the bar being drawn inwardly at the same rate as the center thereof to take up wear, and bars in which the rate of wear at the end portions is substantially equal to that at the center portion, whether this be accomplished by differences in area or differences in pressure at the end portions of the bar bearing surfaces.

It will be understood, therefore, that when I refer to the end portions of the bar fishing surfaces as being of less width than the center portions of such surfaces, I refer to these portions of the bar surfaces in relation to the corresponding surfaces of the rail ends and, particularly, to the width of the area of contact between the respective portions of the bar fishing surfaces and the corresponding surfaces of the rail ends, or the effective pressure between such surfaces.

Referring more particularly to Figures 4 and 5, I have illustrated in Figure 4 the positions of the bars 14, relative to each other and to the rail ends, when the joint is first constructed. It will be noted that the webs 21 of the bars are, at this time, a uniform distance from the webs of the rail ends throughout the full length of the bars, this distance being indicated by D. In Figure 5, I have shown the positions of the bars after the joint has been in use for some time and considerable wear has taken place, the bars being drawn inwardly by the bolts to take up this wear. It will be noted that, in this figure, the distance D' between the webs 21 of the bars and the web of the rail end is still uniform throughout the full length of the bars though appreciably less than the distance D. In this figure, the distance through which these bars have been moved inwardly toward the webs of the rail ends is indicated by $d'$, the original positions of the bars being indicated by dotted lines.

While I have illustrated and described the bars of the joint as parallel with the rail ends throughout their full length, my invention is also capable of use in connection with crowned bars, where use of the same is necessary, as in badly worn joints in which great wear of the rail ends has occurred.

Under such conditions crowned bars may be used to advantage, such bars being constructed in accordance with my invention, that is, in such manner that the area of contact between the rail and bar fishing surfaces is greater at the center portion of the bar than at the end thereof. As previously stated, my invention is directed, in its broader aspects, to a rail joint, and a bar therefor, in which the area of contact between the fishing surfaces of the rail ends and the bars at the center portion of the joint is so related to the area of contact between these surfaces at the end portions of the joint as to obtain a substantially uniform rate of wear throughout the length of the bar. This is advantageous, whether used with straight bars or with bars which are heavily crowned and deflected laterally at the ends to hold the centers in position. When such bars are used in a joint constructed in accordance with my invention, increased flexing of the bar and thereupon increase in stresses to which the bar is subjected, due to wear of the joint, are avoided. In this manner the relation between the bars and the rail ends of the joint which exists when the joint is first made is maintained throughout the life of the bars and undesirable stresses and tension in the bars and the bolts, due to excessive lateral flexing of the bars, are avoided. It is also to be noted, that by my invention, the available draw space can be utilized throughout the full length of the bar so that the life of the bar in service is greatly increased over joints in which the bar is flexed or bent inwardly, since, in such joints the life of the bar in service is terminated when the draw space at the innermost part of the bar has been used up.

Bars constructed in accordance with my invention can be readily produced from new bars or by reforming worn bars. In my copending application for renewing worn angle bars, Serial No. 260,695, filed March 10, 1928, I have disclosed a method in which metal is displaced from the central portion of the bar and is caused to flow outwardly toward the head and flange thereof for filling out the fishing surfaces. This same method, broadly, can be employed in producing the bars of my present invention, the metal being displaced from the head and flange portions of the bar, as described.

While I have illustrated and described my bars as being provided with specially shaped fishing surfaces at both the head and the flange of the bar, such that the width of the contact area between such surfaces and the corresponding surfaces of the rail ends is less at the end portions of the bars than at the center thereof, it is not essential that both the head and the flange fishing surfaces of the bar be thus constructed or arranged. Satisfactory results are obtained in most instances by having either the head or the flange fishing surface of the bar shaped or constructed as above described. Preferably the flange fishing surface is thus formed, the head fishing surface being formed or constructed similarly to that of bars now in common use. It will be understood, however, that either one of the fishing surfaces of the bars may be specially formed or constructed, and either one or both of such surfaces may be so formed or constructed as to assure substantially uniform rate of wear throughout the length of the bar. It will be obvious from the above, that my invention is well adapted to be applied to the so-called "head free" type of bar, in which the head contacts the fillet of the rail and the fishing contact is between the flange of the bar and the flanges of the rail ends. In this type of bar, the flange only of the bar is provided with a fishing surface which is related to the bar flange and the rail end flanges in the manner above set forth.

Also, while I prefer to have the rate of wear substantially uniform, some tolerance may be necessary with certain bars. In such cases the rate of wear should preferably be somewhat greater at the end portions than at the center portion. A slight variation in either direction is permissible, however, so long as excessive lateral flexing of the bars, and consequent excessive tensioning of the bolts accompanied by unequal distribution of bolt tension is avoided.

While I have illustrated and described my invention as applied to bars bolted to the rails, I do not limit it to the particular manner of securing the bars. In its broader aspects, my invention comprehends the use of bars having fishing contact with the rail ends and movable inwardly relative thereto to take up wear, whether such bars be actually bolted to the rail ends or secured thereto in an equivalent manner, as by clamps or other means, the contact areas of the bars and the rail ends being related as above described. It is to be understood, therefore, that the term "bolted", or an equivalent term, used in the appended claims is to be construed as covering either bolting of the bars to the rail ends or any other equivalent means for securing the bars to the rail ends, as above set forth.

What I claim is:

1. A rail joint angle bar adapted for bolting to rail ends and designed for equal rate of wear at its center and end portions, said bar having less area of fishing contact per unit of length at its end portions than at its center portion when applied in a joint.

2. A rail joint angle bar adapted for bolting to rail ends and designed for equal rate of wear at its center and end portions, said bar having less area of fishing contact per unit of length at its end portions than at its center portion and the head and flange fishing surfaces of the bar being in contact with the corresponding surfaces of the rail ends throughout the length of the bar when the bar is applied in a joint.

3. A rail joint angle bar adapted for bolting to rail ends and designed for equal rate of wear at its center and end portions, said bar having less area of fishing surface per unit of length at its end portions that at its center portion and the head and flange fishing surfaces of the bar being in contact with the corresponding surfaces of the rail ends throughout the length of the bar when the bar is applied in a joint.

4. A rail joint angle bar adapted for bolting to rail ends and designed for equal rate of wear at its center and end portions, the flange fishing surface of the bar being of less area per unit of length at the end portions of the bar than at the center portion thereof, the head and flange fishing surfaces of the bar being in contact with the corresponding surfaces of the rail ends throughout the length of the bar when the bar is applied in a joint.

5. A rail joint angle bar adapted for bolting to real ends and designed for equal rate of wear at its center and end portions, certain of the fishing surfaces of the bar decreasing in area from the center portion thereof toward the ends of the bar, the head and flange fishing surfaces of the bar being in contact with the corresponding surfaces of the rail ends throughout the length of the bar when said bar is applied in a joint.

6. A rail joint angle bar adapted for bolting to rail ends and designed for equal rate of wear at its center and end portions, the bar when applied in a rail joint being parallel with the rail ends and having its head and flange fishing surfaces in contact with the corresponding surfaces of the rail ends throughout the length of the bar, the center and end portions of certain of the fishing surfaces of the bar being so disposed and related that the area of contact between the end portions of such surface and the rail surface is less than the area of contact between the center portion of such surface and the rail surface.

7. In a rail joint, angle bars bolted to the rail ends at opposite sides thereof and movable by bolt tension inwardly toward the rails to take up wear, said bars having head and flange fishing surfaces in contact with the corresponding surfaces of the rail ends, the contacting fishing surfaces of the rail ends and the bars being so related and disposed as to cause the fishing surfaces of the bars at the end portions thereof to wear at the same rate as the fishing surfaces of the bars at the center portions thereof.

8. In a rail joint comprising bars bolted to the rail ends and movable by bolt tension inwardly toward the rails to take up wear, means for maintaining substantially uniform rate of wear of the bearing surfaces of the joint at the end and center portions thereof.

9. In a rail joint, in combination with the rail ends, two bars bolted to the rail ends at opposite sides thereof and movable by bolt tension inwardly toward the rails to take up wear, and means for avoiding lateral inward flexure between the center portion and the end portions of the bar and during the major portion of the life of the bar in the joint.

10. A rail joint angle bar adapted for bolting to rail ends and having head and flange fishing surfaces, one of such fishing surfaces tapering in width from the center portion thereof to each end of the bar and the ends of said fishing surface being at a less angle to the horizontal than said center portion thereof.

11. A rail joint angle bar adapted for bolting to rail ends and having head and flange fishing surfaces, each of such fishing surfaces tapering in width from the center portion thereof to each end of the bar and the ends of each of said surfaces being at a less angle to the horizontal than the center portion of such surface.

12. A rail joint bar having a fishing surface adapted for contact with the corresponding fishing surface of the rail at both the center and the end portions of the bar, the end portions of said fishing surface being at a less angle to the horizontal than the center portion thereof.

13. A rail joint bar having a fishing surface adapted for contact with the corresponding fishing surface of the rail at both the center and the end portions of the bar, the angle to the horizontal of the end portions of the bar fishing surface decreasing toward the ends of the bar.

14. A rail joint bar adapted for bolting to rail ends and for top and bottom fishing contact with the rail ends at the center and end portions of the bar, said end portions providing for reduced rail fishing contact relative to the center portions and sufficient to prevent subjecting the center portion and end portions of the bar to lateral bending strains during the major portion of the life of the bar in a joint by assuring substantially even movement of said center and end portions to the rail ends by wear and bolt tension when the bar is in service in a joint.

15. A rail joint bar adapted for bolting to rail ends and for top and bottom fishing contact with the rail ends at the center and end portions of the bar, said end portions providing for reduced rail fishing contact relative to the center portion and sufficient to prevent subjecting the center portion and end portions of the bar to lateral bending strains by wear and bolt tension and effect a balance of center and end bolt tension, when the bar is in service in joint and during the major portion of the life of the bar.

16. A laterally rigid rail joint bar adapted for bolting to rail ends and for top and bottom fishing contact with the rail ends at the center and end portions of the bar, said end portions providing for reduced rail fishing contact relative to the center portion and sufficient to secure rail fishing contact at the center portion of the bar and a balance of center and end bolt tension, when the bar is in service in a joint and during the major portion of the life of the bar.

17. A rail joint bar adapted for bolting to rail ends and for top and bottom fishing contact with the rail ends at the center and end portions of the bar, one of the fishing surfaces of the bar providing for rail fishing contact throughout the length of the bar but with the width of the end portions of said fishing surface reduced sufficiently to assure wear and inward movement of the end portions of the bar in proper relation to wear and inward movement of the center portion of the bar to prevent subjecting said center portion of the bar to objectionable lateral bending strain by wear and center bolt tension, when the bar is in service in a joint and during the major portion of the life of the bar.

18. In a rail joint, in combination with the rail ends, two bars bolted to the rail ends at opposite sides thereof and movable by bolt tension inwardly toward the rails to take up wear, and means for avoiding objectionable inward flexure of the bars by wear and bolt tension during the major portion of the life of the bar in the joint, said bars when initially applied to the rail ends being subjected to substantially equal center and end bolt tension and having fishing contact with the rail ends at their center and end portions.

19. In a rail joint comprising bars bolted to the rail ends and movable by bolt tension inwardly toward the rails to take up wear, means for maintaining substantially uniform rate of movement of the end and center portions of the bars inwardly to the rails by wear and bolt tension during the major portion of the life of the bars in the joint.

20. A rail joint bar comprising a head element, a foot element, and a connecting web, each of said elements extending beyond both sides of the web, said elements having fishing surfaces adapted for center and end fishing contact with the rail ends when the bar is applied in a rail joint, one of said elements being of substantially uniform section throughout its length, and the fishing surface thereof being narrower at its end portions than at its center portion, said bar providing draw space between the center and the ends thereof and the webs of the rail ends when in a joint.

In witness whereof, I hereunto subscribe my name this 16th day of March, 1929.

GEORGE LANGFORD.